(12) United States Patent
Song et al.

(10) Patent No.: US 12,148,104 B2
(45) Date of Patent: Nov. 19, 2024

(54) SYSTEM, APPARATUS AND METHOD FOR PROVIDING ADAPTIVE AR STREAMING SERVICE

(71) Applicant: POSTECH Research and Business Development Foundation, Pohang-si (KR)

(72) Inventors: Hwang Jun Song, Pohang-si (KR); Hyun Min Noh, Incheon (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 254 days.

(21) Appl. No.: 17/731,063

(22) Filed: Apr. 27, 2022

(65) Prior Publication Data

US 2023/0177779 A1 Jun. 8, 2023

(30) Foreign Application Priority Data

Dec. 2, 2021 (KR) .................. 10-2021-0171168

(51) Int. Cl.
  *G06T 19/00* (2011.01)
  *G06T 7/73* (2017.01)
  *G06T 19/20* (2011.01)
  *H04L 65/65* (2022.01)
  *H04L 65/80* (2022.01)

(52) U.S. Cl.
  CPC ............. *G06T 19/006* (2013.01); *G06T 7/73* (2017.01); *G06T 19/20* (2013.01); *H04L 65/65* (2022.05); *H04L 65/80* (2013.01); *G06T 2207/30204* (2013.01); *G06T 2210/36* (2013.01); *G06T 2219/2016* (2013.01)

(58) Field of Classification Search
  None
  See application file for complete search history.

(56) References Cited

FOREIGN PATENT DOCUMENTS

KR    20190133867 A    12/2019

OTHER PUBLICATIONS

Song et al., "Progressive Mesh-based HTTP Adaptive Augmented Reality Streaming System" IEEE, 2021. (Year: 2021).*
Maamar et al., "Streaming 3D Meshes Over Thin Mobile Devices", IEEE, 2013. (Year: 2013).*
H. Noh et al., "Cloud-assisted augmented reality streaming service system: Architecture design and implementation", In 2020 IEEE International Conference on Visual Communications and Image Processing (VCIP) Dec. 1, 2020 (pp. 363-366). IEEE.

* cited by examiner

*Primary Examiner* — Nicholas R Wilson (57) ABSTRACT

A system for providing an adaptive AR streaming service may comprise: a cloud AR server that stores an AR object composed of a plurality of progressive mesh chunks, and a meta file including property information of the AR object and the progressive mesh chunks; and a mobile augmented reality (AR) device that requests and receives the meta file from the cloud AR server, parses the meta file to identify a property of the AR object, and implements augmented reality.

11 Claims, 6 Drawing Sheets

SYSTEM, APPARATUS AND METHOD FOR PROVIDING ADAPTIVE AR STREAMING SERVICE

CROSS-REFERENCE TO RELATED APPLICATIONS

This application claims priority to Korean Patent Application No. 10-2021-0171168, filed on Dec. 2, 2021, with the Korean Intellectual Property Office (KIPO), the entire contents of which are hereby incorporated by reference.

BACKGROUND

1. Technical Field

The present disclosure relates to a system, apparatus and method for providing an adaptive AR streaming service capable of providing real-time AR streaming with low latency and high quality.

2. Related Art

In order to provide a video streaming service with low latency and high quality in a conventional time-varying network, HTTP adaptive streaming (HAS) divides one video into several segments by a specific playback time unit, and each segment is encoded at various target bitrates. A user determines the segment quality so that video playback is not interrupted by using quality information and network quality information with bitrates.

Similarly, the adaptive streaming is required in AR to provide low latency and high quality services in consideration of time-varying network conditions. Conventional AR streaming mainly uses AR content that is independently composed of a fixed quality. Therefore, in order to adaptively provide AR streaming, a 3D object must be provided in the form of a discrete level of detail (DLOD) that exists as an independent file according to the quality of the 3D object. Accordingly, in order for the user to improve the quality of the 3D object, the previously transmitted 3D object of low quality cannot be reused, and the entire object must be newly transmitted.

In the conventional AR streaming, AR content mainly composed of discrete level of detail (DLOD) is transmitted to an AR terminal. Since each DLOD is independently rendered with a fixed quality, the entire AR content must be transmitted for rendering and playback in the AR terminal. Therefore, when it is required to change the quality of the 3D object used as AR content, the entire 3D object of the new quality must be transmitted. Therefore, it is difficult to provide an adaptive AR streaming service in consideration of the user's movement and the network conditions that change according to time.

The conventional technology used the geometry characteristics of 3D object, such as the number of vertices, faces, and edges as quality information. However, when a 3D object is actually played on the user's screen, the perceived quality of the user is different depending on the rotation angle, size, and LOD of the 3D object.

In chunk scheduling for providing a real-time AR streaming service with low latency and high quality, quality information when a 3D object is rendered and played back on the screen of an actual AR terminal should be provided. However, the quality information of the 3D object's rotation angle, size, and LOD is very diverse. Therefore, it is difficult to provide quality information of an actual image considering all cases where a 3D object appears on the screen of an AR terminal, and thus, it is difficult to provide a real-time AR streaming service with low latency and high quality.

SUMMARY

An object of the present disclosure for solving the above problems is to provide a system, an apparatus and a method for providing an adaptive AR streaming service using a compression method of the space quality information of a 3D object that effectively reduces an amount of quality information according to the distance, rotation angle and LOD of the 3D object with downsampling and SVD.

An object of the present disclosure is to provide a system, an apparatus and a method for providing an adaptive AR streaming service using a chunk scheduling method in consideration of the quality of a 3D object composed of a progressive mesh being reproduced on the screen of an AR terminal according to a distance, a rotation angle, and an LOD.

According to an exemplary embodiment of the present disclosure, a system for providing an adaptive AR streaming service may comprise: a cloud AR server that stores an AR object composed of a plurality of progressive mesh chunks, and a meta file including property information of the AR object and the progressive mesh chunks; and a mobile augmented reality (AR) device that requests and receives the meta file from the cloud AR server, parses the meta file to identify a property of the AR object, and implements augmented reality.

The system may use a method for providing an AR streaming service with low latency and high quality in a time-varying unstable network by applying progressive mesh-based AR content to improve scalability and effectively compressing and providing quality information according to a distance, rotation angle, and LOD of a 3D object displayed on a screen of a real AR content.

The system may use a chunk scheduling method to improve visual perceptual quality of the AR streaming service by using a method for effectively compressing and providing quality information.

The system may use a root mean square error (RMSE) that is a value weighted by displaying a scale value of the AR object on a screen as an objective measure of spatial quality.

In the system, an initial latency may be defined as a time interval required to display all AR objects on a screen regardless of spatial quality, and may be adopted as a measure of temporal quality.

The cloud AR server may be designed with a meta file structure in which a basic structure of the meta file is HTTP HAS (Adaptive Streaming).

The mobile augmented reality (AR) device may include a camera that continuously detects an AR marker to generate a camera image.

The mobile augmented reality (AR) device may include a marker detector that identifies a marker ID, coordinate, and a corresponding URL of the AR object when an AR marker is detected by continuously sensing the AR marker in a camera image.

The mobile augmented reality (AR) device may include a network monitor that continuously collects network status and estimates available throughput in the future.

The mobile augmented reality (AR) device may include a chunk scheduler that selects and requests a next chunk in order to maximize human visual perceptual quality.

The mobile augmented reality (AR) device may include an object renderer that renders a matching AR object and displays it on a screen when a requested chunk arrives.

According to another exemplary embodiment of the present disclosure, an apparatus for providing an adaptive AR streaming service may comprise: a processor; and a memory that stores at least one instruction executed by the processor, wherein the at least one instruction may be configured to cause the processor to perform the steps of: reducing a spatial quality information overhead to provide an AR streaming service with low latency and high quality in a time-varying unstable network by applying progressive mesh-based AR content to improve scalability and effectively compressing and providing quality information according to a distance, rotation angle, and LOD of a 3D object displayed on a screen of a real AR content; and a chunk scheduling process to improve visual perceptual quality of the AR streaming service by utilizing a method for effectively compressing and providing quality information.

According to yet another exemplary embodiment of the present disclosure, a method for providing an adaptive AR streaming service may comprise the steps of: reducing a spatial quality information overhead to provide an AR streaming service with low latency and high quality in a time-varying unstable network by applying progressive mesh-based AR content to improve scalability and effectively compressing and providing quality information according to a distance, rotation angle, and LOD of a 3D object displayed on a screen of a real AR content; and a chunk scheduling process to improve visual perceptual quality of the AR streaming service by utilizing a method for effectively compressing and providing quality information.

The step of reducing a spatial quality information overhead may comprise the steps of: (a) sampling with a discrete value according to Equation 5 since the rotation angle and the distance are continuous real numbers; (b) downsampling and then decomposing an RMS matrix with SVD in order to reduce a dimension of the RMS matrix according to Equations 6, 7, 8, and 9; and (c) reconstructing the RMS matrix through inverse SVD and upscaling using only large singular value and related vector according to Equation 10 and using the reconstructed RMS matrix for the chunk scheduling.

In the step (a), among the sampled rotation angles, a set of key rotation angles rotating around the x-axis may be defined as P, and a set of rotation angles rotating around the z-axis may be defined as Y, RMS information at a distance for LOD #1 may be expressed as in Equation 5, and the RMS matrix may use downsampling and singular value decomposition (SVD) to reduce the size of the RMS matrix.

In the step (b), the RMS matrix reduced by the downsampling may be decomposed into S, U, and V matrices through the SVD process, in the matrix decomposed through the SVD, more information of an original RMS matrix may be included in the singular value with high value and related vector.

In the step (c), $n^{eigen}$ and $n^{scale}$, which guarantee a R-squared value between an original RMS matrix, $RMS_{i,j,k}$ and the $RMS_{i,j,k}^{rec}$ generated through the S, U, and V matrices generated in the step (b) and the upscaling, is higher than 0.95, may be determined through global search, RMS information according to the rotation angle included in P and Y may be transmitted by providing only the $n^{eigen}$ singular values and related eigenvectors, not the entire RMS matrix in a mobile terminal, when the 3D object is rendered and playbacked by rotating at an angle not belonging to P and Y, an RMS value at an adjacent rotation angle included in P and Y may be obtained by linear interpolation.

The chunk scheduling process may comprise the steps of: (d) initializing $\vec{l}^{trans}$ to 0; (e) transmitting $c_{i,j}^{byte}$ (for $1 \leq i \leq N_{AR}$ and $1 \leq j \leq L_i^{max}()$) and S, V, and D values from an AR server, and reconstructing a RMS matrix through the S, V, and D; (f) at an AR terminal, identifying $\vec{\theta}$, $\vec{\psi}$, $\vec{d}$, and $\widetilde{tr}_{tcp}$; (g) checking whether or not an expected download time for LOD #$l_i^{trans}$+1 chunk of AR content #i exceeds $T^{max}$ and going to step (i) if one or more chunks excess; (h) after selecting the AR content #i that maximizes Equation 12, going to step (j); (i) when receiving the LOD #$l_i^{trans}$+1 chunk, selecting the AR content #i that minimizes Equation 15 considering a tradeoff between WRMS and transmission delay; (j) requesting a next chunk of the selected AR content #i; (k) when the requested chunk is received, updating $l_i^{trans}$ of $\vec{l}^{trans}$ with $l_i^{trans}$+1; and (l) repeatedly performing the steps (f) to (k) until all progressive mesh chunks are received.

In addition, the present disclosure may provide a computer program stored in a computer-readable recording medium for implementing the above-described method for providing an adaptive AR streaming service.

In addition, the present disclosure may provide a computer-readable recording medium for implementing the program of the above-described method for providing an adaptive AR streaming service.

According to the present disclosure, when a user improves the quality of a 3D object by applying a progressive mesh that supports CLOD, differently from DLOD, existing data with low quality can be reused, so there is no need to receive the entire 3D object with new quality.

The amount of quality information according to the distance, rotation angle, and LOD of the 3D object can be effectively reduced by using downsampling and singular value decomposition (SVD).

Chunk scheduling may be performed in consideration of the quality of a 3D object composed of a progressive mesh being reproduced on the screen of an AR terminal according to a distance, a rotation angle, and an LOD.

By providing an adaptive AR streaming service in consideration of the quality of a 3D object being rendered and playbacked on the screen of an AR terminal, there is an effect of being able to receive an AR service with low latency and high quality even in a time-varying unstable network state.

DETAILED DESCRIPTION OF THE EMBODIMENTS

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
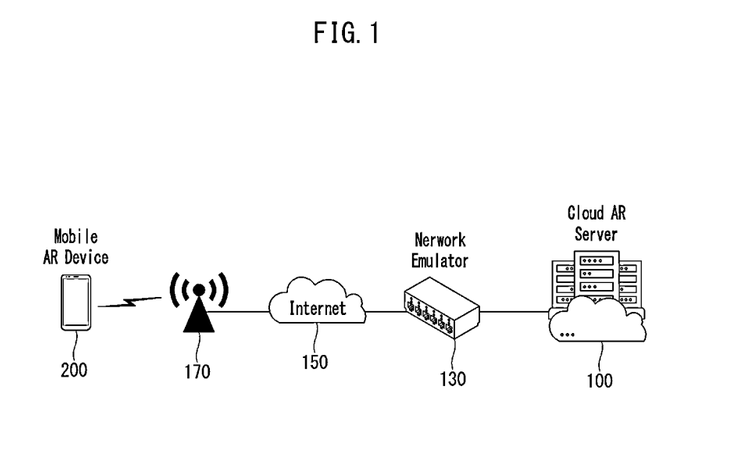
FIGS. 1 and 2 are schematic diagrams of a system for providing an adaptive AR streaming service according to an embodiment of the present disclosure.
Figure 2:
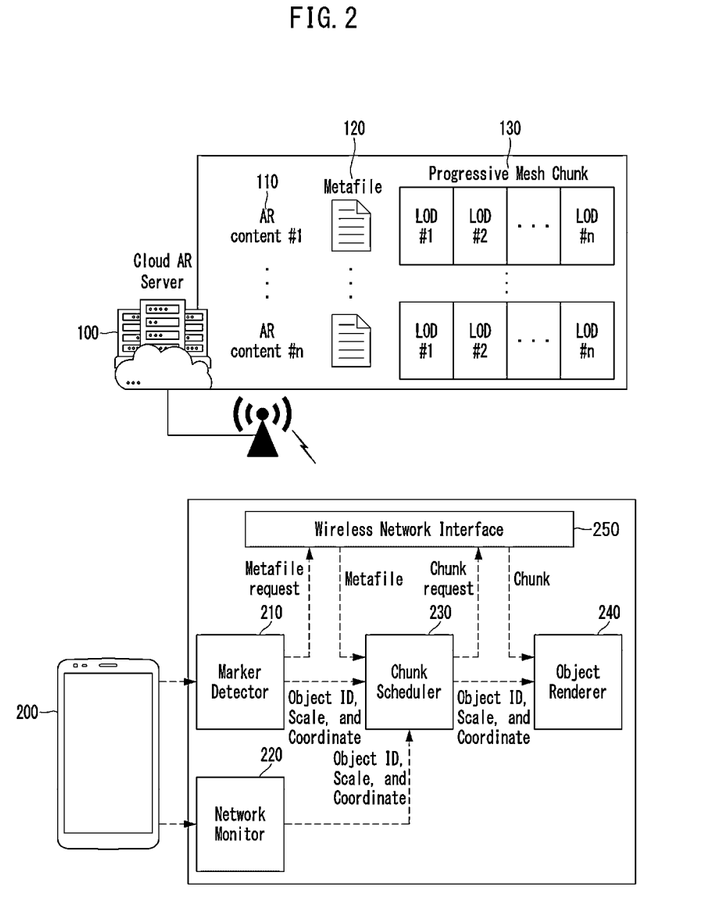

FIGS. 1 and 2 are schematic diagrams of a system for providing an adaptive AR streaming service according to an embodiment of the present disclosure.

Referring to FIGS. 1 and 2, an object of the system for providing an adaptive AR streaming service according to an embodiment of the present disclosure is to provide a high-quality adaptive AR streaming service through fast interaction over a time-varying wireless network.

A system for providing an adaptive AR streaming service according to an embodiment of the present disclosure includes a cloud AR server 100, a network emulator 130, an Internet 150, a wireless access point (AP), and a mobile augmented reality (AR) device 200, and uses a progressive mesh to improve the scalability of the AR streaming service.

The cloud AR server 100 stores an AR object 110 and a corresponding meta file 120. The AR object is composed of several progressive mesh chunks, and the meta file includes the AR object and the property information of the progressive mesh chunk 130. The meta file plays an important role in distributing the properties of the progressive mesh chunk 130 to the mobile AR device. The basic structure is designed by referring to the meta file structure of HTTP HAS (Adaptive Streaming).

The mobile augmented reality (AR) device 200 includes a marker detector 210, a network monitor 220, a chunk scheduler 230, an object renderer 240, and a wireless network interface 250.

The marker detector 210 continuously detects an AR marker 10 in the image of the camera 250. When the AR marker 10 is detected, the marker detector 210 identifies a marker ID, coordinates, and a corresponding URL of the AR object. Then, the mobile augmented reality (AR) device 200 requests and receives the meta file 120 from the cloud AR server 100. The meta file 120 is parsed to identify the AR object properties.

At the same time, the network monitor 220 continuously collects network status and estimates usable throughput in the future.

Using such information, the chunk scheduler 230 selects and requests the next chunk in order to maximize human visual perceptual quality. When the requested chunk arrives, the object renderer 240 renders the matching AR object and displays it on the screen. In fact, the human visual perceptual quality of AR streaming service depends on both spatial quality and temporal quality at the same time.

In the system for providing an adaptive AR streaming service according to an embodiment of the present disclosure, a root mean square error (RMSE), a value weighted by displaying a scale value of an AR object on a screen, is used as an objective measure of spatial quality. In addition, initial latency is defined as the time interval required to display all AR objects on the screen, regardless of their spatial quality, and is adopted as a measure of temporal quality.

Figure 3:
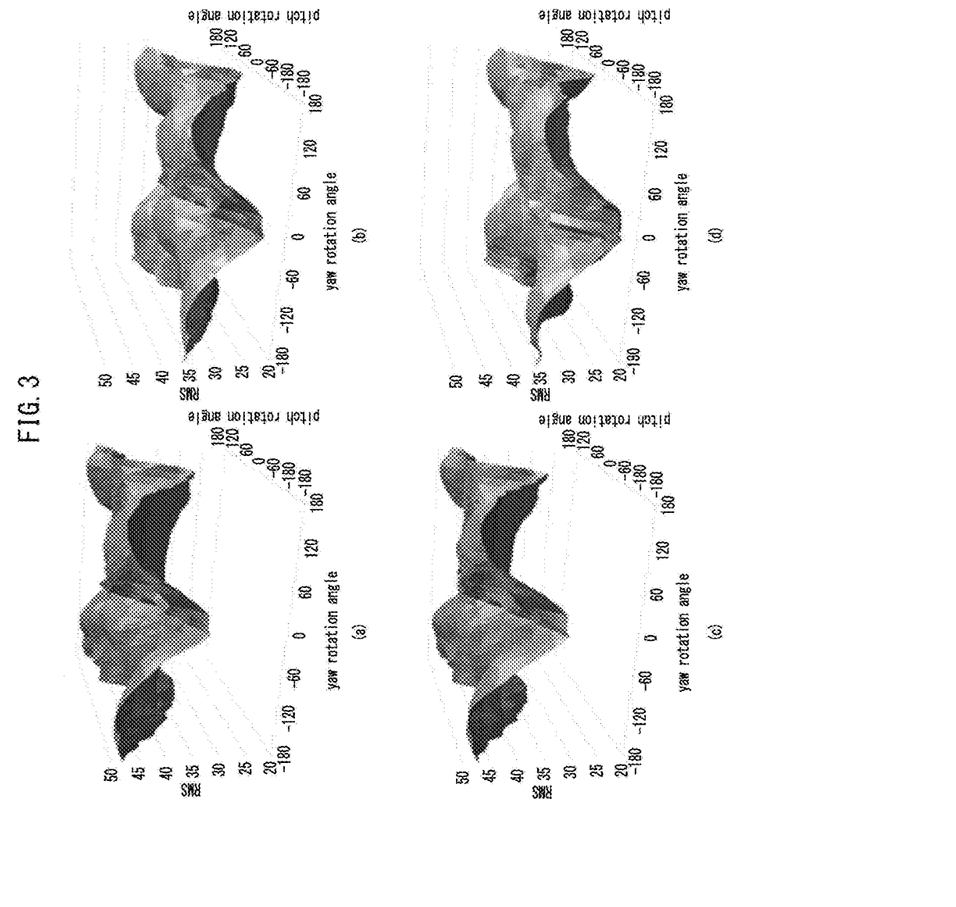
FIG. 3 is a conceptual diagram for explaining the rotation of an object according to the position of the camera 250 of the system for providing an adaptive AR streaming service according to an embodiment of the present disclosure.

FIG. 3 is a conceptual diagram for explaining the rotation of an object according to the position of the camera 250 of the system for providing an adaptive AR streaming service according to an embodiment of the present disclosure.

Referring to FIG. 3, in the present disclosure, the marker 10 may be used to identify the location where the AR content should be rendered and playbacked and its shape.

The present disclosure assumes that all the markers 10 are located on a plane including a floor and walls.

When the marker 10 is identified by the camera 250 of the AR terminal 200, the plane position of the AR content can be expressed as follows.

$$\begin{bmatrix} u \\ v \\ 1 \end{bmatrix} = \begin{bmatrix} f_x & \gamma & c_x \\ 0 & f_y & c_y \\ 0 & 0 & 1 \end{bmatrix} \begin{bmatrix} r_{1,1} & r_{1,2} & r_{1,3} & t_{1,1} \\ r_{2,1} & r_{2,2} & r_{2,3} & t_{2,1} \\ r_{3,1} & r_{3,2} & r_{3,3} & t_{3,1} \end{bmatrix} \begin{bmatrix} x \\ y \\ z \\ 1 \end{bmatrix} \quad \text{[Equation 1]}$$

In Equation 1 above, x, y and z are the coordinates of a 3D point in a world coordinate space, u and v are the pixel coordinates of the image plane projected on the screen of a user terminal, and $f_x$ and $f_y$ are focal lengths, $c_x$ and $c_y$ are principal points. $\gamma$ is a skew parameter. $f_x$, $f_y$, $c_x$, $c_y$ and $\gamma$ can be obtained by camera calibration. The rotation and translation elements ($r_{i,j}$ and $t_{i,j}$) of the object in Equation 1 can be obtained using AR and vision processing libraries such as ARToolkit, ARKit, ARCore, and OpenCV. Then, the detected marker rotation angle and distance can be calculated as follows.

$$\theta = \sin^{-1}(-r_{2,3}) \quad \text{[Equation 2]}$$

$$\psi = \tan^{-1}\left(\frac{r_{2,1}}{r_{2,2}}\right) \quad \text{[Equation 3]}$$

$$d = \sqrt{t_{1,1}^2 + t_{2,1}^2 + t_{3,1}^2} \quad \text{[Equation 4]}$$

In the above equation, $\theta$ and $\psi$ denote a rotation angle about the x-axis and z-axis, respectively, d is the distance between the mobile AR device 200 and the center of the marker 10. The size of the marker 10 on the screen is inversely proportional to d. The human visual perceptual quality of rendered AR content is related to the rotation angles ($\theta$ and $\psi$), distance and LOD.

Figure 4:
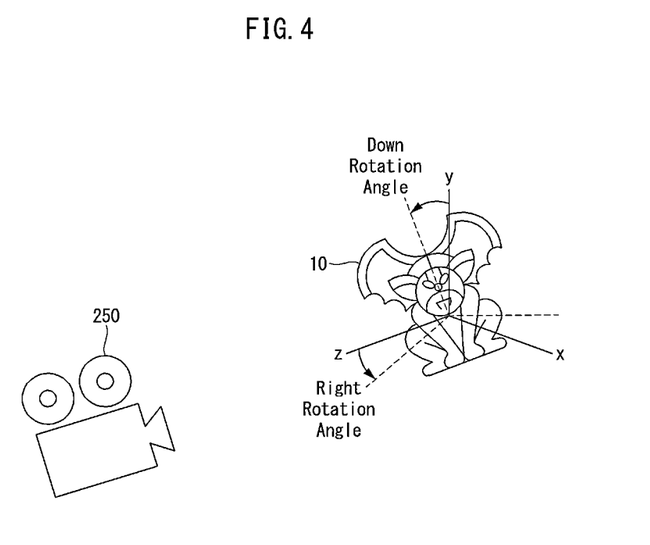
FIG. 4 is a graph for explaining RMS according to the rotation angle, distance, and LOD of a Gargo 3D object in a method for providing an adaptive AR streaming service according to an embodiment of the present disclosure.

FIG. 4 is a graph for explaining RMS according to the rotation angle, distance, and LOD of a Gargo 3D object in a method for providing an adaptive AR streaming service according to an embodiment of the present disclosure.

Referring to FIG. 4, in the RMS according to the rotation angle, distance, and LOD of the Gargo 3D object in the method for providing an adaptive AR streaming service according to an embodiment of the present disclosure, (a) Distance is 45 cm, LOD #1, (b) distance is 45 cm, LOD #2, (c) distance is 60 cm, LOD #1 and (d) distance is 60 cm, LOD #2.

In the present disclosure, the 3D object uses the root mean square (RMS) of the image projected on the screen of the mobile AR device as an objective quality. When a mobile AR device requests multiple AR contents over a wireless network with limited bandwidth, the LOD chunk of the next requested AR content should be carefully selected to improve the user's visual quality according to the object's rotation angle and the distance of the AR content. The RMS of AR content is required for chunk scheduling to provide a low latency and high quality service, but since the RMS according to all rotation angles, distances, and LODs are very different as shown in FIG. 2, providing the RMS information for all situations is a great burden on the wireless network with limited bandwidth.

In order to solve this problem, the present disclosure proposes a compression technique of spatial quality information capable of efficiently transmitting RMS information with low overhead and a scheduling method using the same.

1) A Method for Reducing Spatial Quality Information Overhead

Depending on the rotation of the 3D object, the distance from the camera, and the change of the LOD, the quality displayed in the actual AR terminal is very different. The present disclosure proposes a process of reducing spatial quality information overhead according to the rotation of the 3D object, the distance, and the LOD in order to efficiently transmit it to the AR terminal.

First, since the rotation angle and distance are continuous real numbers, the sampling is performed with discrete values. Among the sampled rotation angles, the set of key rotation angles rotating around the x-axis is defined as P, the set of rotation angles rotating around the z-axis is defined as Y. The RMS information at a distance for LOD #1 may be expressed as follows.

$$\text{RMS}_{i,l,k} = \begin{bmatrix} \text{rms}_{1,1}^{i,l,k} & \cdots & \text{rms}_{1,|P|}^{i,l,k} \\ \vdots & \ddots & \vdots \\ \text{rms}_{|Y|,1}^{i,l,k} & \cdots & \text{rms}_{|Y|,|P|}^{i,l,k} \end{bmatrix} \quad \text{[Equation 5]}$$

In the above equation, at the distance k, when rotated nth ($\in P$) about the z-axis and rotated by the mth angle ($\in Y$) around the x-axis, $\text{rms}_{m,n}^{i,l,k}$ is the RMS between the image displayed on the screen of the AR terminal when AR content #i renders a chunk of LOD #l, and the image displayed on the screen of the AR terminal when AR content #i renders the maximum LOD chunk. The above RMS matrix uses downsampling and singular value decomposition (SVD) to reduce the size of the RMS matrix. In order to reduce the dimension of the RMS matrix, downsampling is performed as shown below, and then decomposed with the SVD.

$$\text{Down}(n^{scale}, \text{RMS}_{i,l,k}) = U_{i,l,k} S_{i,l,k} V_{i,l,k}^T \quad \text{[Equation 6]}$$

$$U_{i,l,k} = \left[ u_1^{i,l,k} \ldots u_{\frac{|P|}{n^{scale}}}^{i,l,k} \right] \quad \text{[Equation 7]}$$

$$S_{i,l,k} = \text{diag}\left(\delta_1^{i,l,k}, \delta_2^{i,l,k}, \ldots, \delta_{n_{max}^{eigen}}^{i,l,k}()\right) \quad \text{[Equation 8]}$$

$$V_{l,k} = \left[ v_1^{l,k} \ldots v_{\frac{|Y|}{n^{scale}}}^{l,k} \right] \quad \text{[Equation 9]}$$

In the above equation, Down is an operator that reduces the RMS matrix in the $|P| \times |Q|$ dimension to $$\frac{|P|}{n^{scale}} \times \frac{|Y|}{n^{scale}}$$

by using downsampling, $U_{i,l,k}$ and $V_{i,l,k}$ are rectangular orthogonal matrixes that satisfy $U_{i,l,k} U_{i,l,k}^T = I$ and $V_{i,l,k} V_{i,l,k}^T = I$, and $S_{i,l,k}$ is a diagonal matrix composed of the square of the singular values in which the diagonal elements are arranged in descending order. $n_{max}^{eigen}$ has a value of min $$\left(\frac{|P|}{n^{scale}}, \frac{|Y|}{n^{scale}}\right),$$

$u_m^{i,l,k}$ and $v_m^{i,l,k}$ are orthogonal eigenvectors associated with a singular value. The RMS matrix reduced by the downsampling is decomposed into S, U, and V matrices through the SVD process. In the matrix decomposed through the SVD, more information of the original RMS matrix is included in the singular values with high values and related vectors.

In the present disclosure, by using only large singular values and related vectors, the RMS matrix is reconstructed through inverse SVD and upscaling as follows and used for chunk scheduling.

$$RMS_{i,l,k}^{rec} = UP(n^{scale}, \Sigma_{m=1}^{n^{eigen}} u_m^{i,l,k} \delta_m^{i,l,k} v_m^{i,l,k^T}) \quad \text{[Equation 10]}$$

In the above equation, UP is an upscaling operator that increases the size of the matrix by $n^{scale}$ times, and $n^{eigen}$ is the number of singular values used to reconstruct the RMS matrix through the upscaling. In the present disclosure, $n^{eigen}$ and $n^{scale}$, which guarantee the R-squared value between the original RMS matrix, $RMS_{i,l,k}$ and the RMS matrix generated through upscaling, $RMS_{i,l,k}^{rec}$ is higher than 0.95, are determined through global search. Therefore, by providing only the $n^{eigen}$ singular values and related eigenvectors, not the entire RMS matrix in the mobile terminal, the RMS information according to the rotation angle included in P and Y can be transmitted. When a 3D object is rendered and playbacked by rotating at an angle not belonging to P and Y, the RMS value at the adjacent rotation angle included in P and Y is obtained by linear interpolation.

2) Chunk Scheduling Process

In the present disclosure, a low-level chunk including a low-detail mesh is first requested without waiting until all chunks constituting the AR content are received using a progressive mesh. Next, the AR content is rendered and played on the screen as soon as it is transmitted to the AR terminal. After that, a high-level chunk containing the previously transmitted high-detail mesh is requested. Additionally requested high-level chunk is used to progressively enhance the detail of the corresponding AR content as soon as it arrives. In order to determine which level of chunk of which AR content is requested first when multiple AR contents are requested simultaneously, the WRMS defined as follows is defined in the present disclosure as an objective spatial perceptual quality measure for the AR streaming service.

$$WRMS(\vec{d}) = \sum_{i=1}^{N_{AR}} \omega(i,\vec{d}) \cdot RMS_i \quad \text{[Equation 11]}$$

In the above equation, $\vec{d}$ is the distance vector of the AR content (the display scale value of the AR content playbacked on the screen is inversely proportional to the distance between the AR mobile device and the marker), $RMS_i$ is the RMS value of the AR content #i, and $\omega(i, \vec{d})$ is the scale weight of the AR content #i displayed on the screen. It is inversely proportional to the distance between the mobile AR terminal and the marker, and the sum of the weights is set to 1 ($\Sigma_{i=1}^{N_{AR}}\omega(i, \vec{d})=1$). In the present disclosure, the next chunk is selected to minimize the above WRMS during the AR streaming service. To this end, the chunk scheduling problem is formalized as follows:

Problem Definition: Given $\vec{\psi}$, $\vec{\theta}$, and $\vec{d}$, determine the AR content #i that maximizes the equation below.

$$\frac{\omega(i,\vec{d})(RMS_i(\theta_i, \psi_i, d_i, l_i^{trans}) - RMS_i(\theta_i, \psi_i, d_i, l_i^{trans} + 1))}{c_{i,l_i^{trans}+1}^{byte}} \quad \text{[Equation 12]}$$

-continued subject to $l_i^{trans} + 1 < L_i^{max}$ [Equation 13]

$$T^{con} + \frac{c_{i,l_i^{trans}}^{byte}}{\widetilde{tr}_{tcp}} < T^{max} \quad \text{[Equation 14]}$$

In the above equation, $\vec{l}^{trans} = (l_1^{trans}, l_2^{trans}, \ldots, l_{N_{AR}}^{trans})$ is the LOD chunk vector already received by the AR terminal, and $l_i^{trans}$ denotes the LOD of the AR content #i chunk received so far.

$\vec{\theta} = (\theta_1, \theta_2, \ldots, \theta_{N_{AR}})$ is a rotation angle vector about the x-axis, and $\theta_i$ is the angle at which AR content #i is rotated about the x-axis.

$\vec{\psi} = (\psi_1, \psi_2, \ldots, \psi_{N_{AR}})$ is an angle vector rotated around the z-axis, where $\psi_f$ is the angle at which AR content #i is rotated around the z-axis. $\vec{d} = (d_1, d_2, \ldots, d_{N_{AR}})$ is the distance vector, and $d_i$ is the distance between the mobile AR device and the marker of the AR content #i.

$RMS_i(\psi_i, \theta_i, d_i, l_i^{trans})$ is replaced with $\widetilde{RMS}_i(\psi_i, \theta_i, d_i, l_i)$ obtained by calculating by linear interpolation of an adjacent $RMS_{i,l,k}^{rec}$ matrix, $L_i^{max}$ is the maximum LOD of AR content #i, and $c_{i,j}^{byte}$ is the chunk size of LOD #j of AR content #i.

$\widetilde{tr}_{tcp}$ is the TCP throughput of the AR terminal, $T^{con}$ is the time consumed from the start of AR streaming to the present, and $T^{max}$ is the maximum allowable waiting time, and this value may be set differently by a mobile user. The purpose of the proposed chunk scheduling is to determine the next LOD chunk to minimize WRMS up to $T^{max}$.

Equation 13 means that the next chunk of LOD of the next requested AR content #i must be smaller than the maximum LOD of the AR content, and Equation 14 represents the constraint that the next requested chunk should arrive within $T^{max}$. Details of the chunk scheduling process in the AR terminal are as follows.

In step 100, $\vec{l}^{trans}$ is initialized to 0.

In step 200, $c_{i,j}^{byte}$ (for $1 \leq i \leq N_{AR}$ and $1 \leq j \leq L_i^{max}(\;)$) and S, V, and D values are transmitted from the AR server, and the RMS matrix is reconstructed through the S, V, and D.

In step 300, the AR terminal identifies $\vec{\theta}$, $\vec{\psi}$, $\vec{d}$, and $\widetilde{tr}_{tcp}$.

In step 400, it is checked whether or not the expected download time for the LOD #$l_i^{trans}+1$ chunk of the AR content #i exceeds $T^{max}$. If one or more chunks excess, the process goes to step 600.

In step 500, after selecting the AR content #i that maximizes Equation 12, the process goes to step 700.

In step 600, when receiving the LOD #$l_i^{trans}+1$ chunk, the AR content #i that minimizes Equation 15 considering the tradeoff between the WRMS and the transmission delay is selected.

[Equation 15]

$$(1-\alpha)\left(1 - \frac{(RMS_i(\psi_i,\theta_i,d_i,l_i^{trans}) - RMS_i(\psi_i,\theta_i,d_i,l_i^{trans}+1))}{\sum_{k=1}^{N_{AR}} \omega(i,\vec{d})(RMS_i(\psi_i,\theta_i,d_i,l_i^{trans}))}\right) +$$

-continued $$\alpha \cdot \max\left(\frac{\left(T^{con} + \frac{c_{i,l_i^{trans}+1}^{byte}}{\bar{tr}_{tcp}}\right) - T^{max}}{T^{max}, 0}\right).$$

In step 700, the next chunk of the selected AR content #i is requested.

In step 800, when the requested chunk is received, the $l_i^{trans}$ of $\vec{l}^{trans}$ is updated with $l_i^{trans}+1$.

In step 900, steps 300 to 800 are repeatedly performed until all progressive mesh chunks are received.

TABLE 1

Algorithm: Chunk Scheduling Process

Input: $\vec{\theta}$, $\vec{\psi}$, $\vec{d}$, $\bar{tr}_{tcp}$, $c_{i,j}^{byte}$, and $RMS_{i,j,k}^{rec}$
(for $1 \leq i \leq N_{AR}$, $1 \leq j \leq L_i^{max}$, and $k \in D$)
1:    Initialize $l_i^{trans} \leftarrow 0$ for $1 \leq i \leq N_{AR}$
2:    While $l_i^{trans} < L_i^{max}$ for $\exists i$
3:       Update $\vec{\psi}$, $\vec{\theta}$, $\vec{d}$, through the marker detector
4:       Update $\bar{tr}_{tcp}$ through the networking monitor
5:       If $T^{con} + \frac{c_{i,l_i^{trans}}^{byte}}{tr_{tcp}^{\pm}} < T_{max}$ for $\forall i$
6:         Select i that maximizes Eq. 12
7:       Else
8:         Select i that minimizes Eq. 15
9:         Request the chunk of the LOD #$l_i^{trans}$ + 1 for AR content #i
10:      Wait until receiving requesting chunk, then update $l_i^{trans}$ to $l_i^{trans}$ + 1
11:      End while FIG. 5 is an XML structure diagram of a proposed meta file of a system for providing an adaptive AR streaming service according to an embodiment of the present disclosure.

Figure 5:
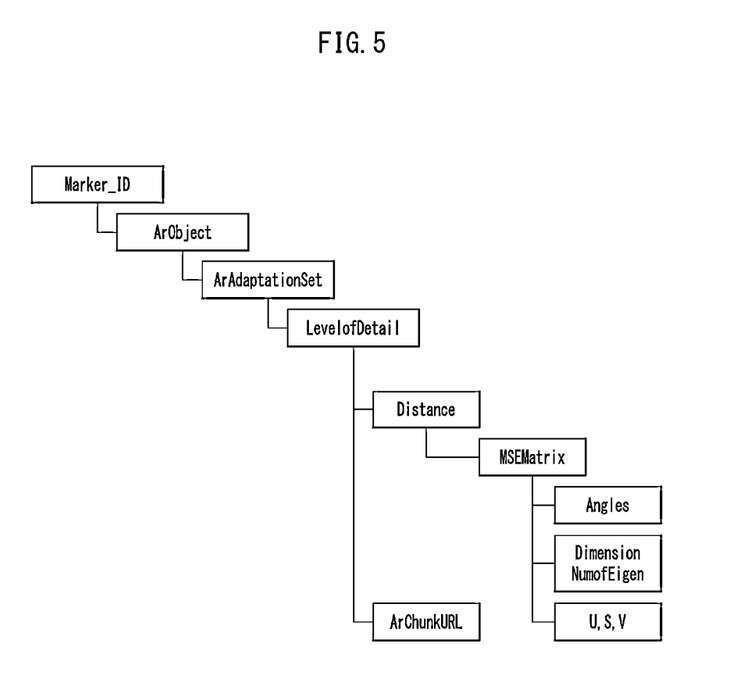
FIG. 5 is an XML structure diagram of a proposed meta file of a system for providing an adaptive AR streaming service according to an embodiment of the present disclosure.

Referring to FIG. 5, a meta file structure and format of a system for providing an adaptive AR streaming service according to an embodiment of the present disclosure is disclosed.

The AR object is composed of multilevel progressive mesh chunks, and its properties are inserted into the meta file. One of the unique properties of the proposed meta file includes RMSE information and bitrate information for multilevel progressive mesh chunks.

Since the rate distortion information of the meta file is very helpful in improving the quality of a video streaming service in a time-varying wireless network, the proposed meta file has a hierarchical structure as shown in FIG. 5. In the uppermost layer, Marker_ID indicates a detected marker ID. The ArObject layer indicates the name of the AR object corresponding to the marker ID. The ArAdaptationSet layer is composed of several LevelOfDetails including the Distance and ArChunkURL of each LOD chunk. The Distance represents the distance between the mobile AR device and the detected marker. The lower level of the Distance includes RMSE matrix reconstruction information such as key angle, dimension, singular value (S) and associated vectors (U and V). ArChunkURL indicates the URL and size (bytes) of the progressive mesh chunk. Based on the RMSE and the chunk size, the mobile AR device uses HTTP to select the next request chunk to be downloaded from the identified URL.

Figure 6:
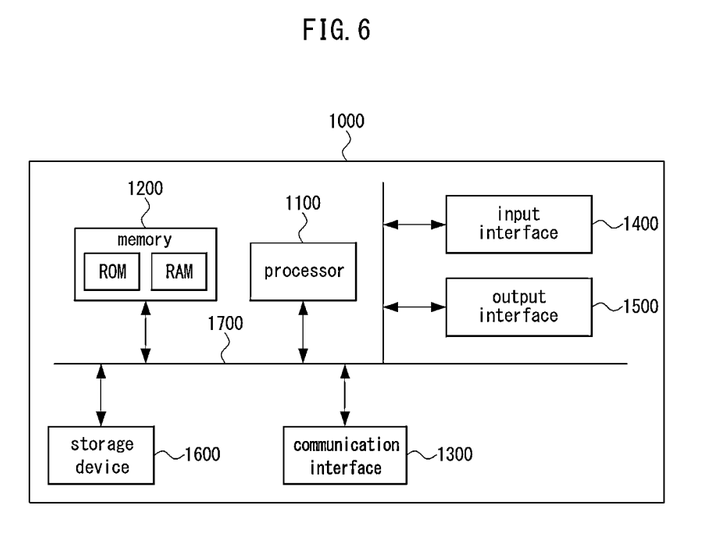
FIG. 6 is a configuration diagram of an apparatus 1000 for providing an adaptive AR streaming service according to an embodiment of the present disclosure.

FIG. 6 is a configuration diagram of an apparatus 1000 for providing an adaptive AR streaming service according to an embodiment of the present disclosure.

Referring to FIG. 6, the image-based texture expression motion generation and merging apparatus 1000 according to an embodiment of the present disclosure may be configured to include a processor 1100, a memory 1200, a transceiver 1300, and an input interface device 1400, an output interface device 1500, a storage device 1600 and a bus 1700.

The apparatus 1000 for providing an adaptive AR streaming service of the present disclosure may include at least one processor 1100 and a memory 1200 that stores the instructions for instructing the at least one processor to perform at least one step.

The processor 1100 may refer to a central processing unit (CPU), a graphics processing unit (GPU) or a dedicated processor on which methods according to embodiments of the present disclosure are performed.

Each of the memory 1200 and the storage device 1600 may be configured as at least one of a volatile storage medium and a non-volatile storage medium. For example, the memory 1200 may be configured as at least one of a read only memory (ROM) and a random access memory (RAM).

Further, the apparatus 1000 for providing an adaptive AR streaming service may include the transceiver 1300 that performs communication through a wireless network.

Still further, the apparatus 1000 for providing an adaptive AR streaming service may further include the input interface device 1400, the output interface device 1500, the storage device 1600, and the like.

Still further, each component included in the apparatus 1000 for providing an adaptive AR streaming service may be connected by a bus 1700 to communicate with each other.

As examples of the device 1000 for providing an adaptive AR streaming service of the present disclosure, there may be a communicable desktop computer, a laptop computer, a notebook, a smart phone, a tablet PC, a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, a digital video recorder, a digital video player, a personal digital assistant (PDA) and the like.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A system for providing an adaptive augmented reality (AR) streaming service, comprising:
a mobile AR device that includes an AR object composed of a plurality of progressive mesh chunks, is configured to communicate with a cloud AR server where a meta file containing property information of the AR object and progressive mesh chunks is stored, and is configured to implement augmented reality,
the mobile AR device comprises:
a marker detector configured to detect a marker to identify a marker identification (ID), coordinates, and a corresponding uniform resource locator (URL) of the AR object and request a meta file to the cloud AR server to identify properties of the AR object based on the URL;
a network monitor configured to collect network status and estimate available throughput;
a chunk scheduler configured to receive the meta file from the cloud AR server, select a chunk to improve quality of a visual perception of a user based on the available throughput, and request the selected chunk to the cloud AR server; and
an object renderer configured to receive the chunk from the cloud AR server and render an AR object matching the received chunk,
wherein a processor of the mobile AR device is configured to measure a level of detail (LOD) quality of angles at which the AR object is projected onto a camera, receive quality information from the cloud AR server about rotation angles that reduce an amount of quality information according to the rotation angles of the AR object through downsampling and singular value decomposition (SVD), and perform chunk scheduling or rendering according to quality according to the rotation angle of the AR object projected onto a screen of the mobile AR device.

2. The system for providing an adaptive augmented reality (AR) streaming service according to claim 1, wherein the processor is configured to suppose the marker that is located on an image plane including a floor and walls, express a pixel coordinate of the image plane projected on a screen of an AR terminal as coordinates of a three-dimensional (3D) point in a coordinate space, and use the marker to identify a location where an AR content to be rendered and playbacked and a shape of the AR content.

3. The system for providing an adaptive augmented reality (AR) streaming service according to claim 2, wherein the processor is configured to calculate a rotation angle centered on an x-axis and a rotation angle centered on a z-axis of a 3D object in a coordinate space and a distance between the camera of the AR terminal and a center of the marker.

4. The system for providing an adaptive augmented reality (AR) streaming service according to claim 3, wherein the processor is configured to sample the calculated rotation angles and the distance as discrete values.

5. The system for providing an adaptive augmented reality (AR) streaming service according to claim 4, wherein the processor is configured to define a set of rotation angles that rotate around the x-axis and a set of rotation angles that rotate around the z-axis among the sampled rotation angles.

6. The system for providing an adaptive augmented reality (AR) streaming service according to claim 5, wherein the processor is configured to obtain a root mean square (RMS) matrix for calculating an RMS between an image rendered with a LOD chunk of a particular rotation angle based on the sets of rotation angles and an image rendered with a LOD chunk with a maximum rotation angle in the defined sets of rotation ranges.

7. The system for providing an adaptive augmented reality (AR) streaming service according to claim 6, wherein the processor is configured to reduce a dimension of the RMS matrix by downsampling, and decompose the RMS matrix reduced by the downsampling into a one-dimensional matrix through singular value decomposition (SVD).

8. The system for providing an adaptive augmented reality (AR) streaming service according to claim 7, wherein the processor is configured to reconstruct the RMS matrix through reverse SVD and upscaling to the one-dimensional matrix.

9. The system for providing an adaptive augmented reality (AR) streaming service according to claim 8, wherein the processor is configured to perform a chunk scheduling using the reconstructed RMS matrix.

10. The system for providing an adaptive augmented reality (AR) streaming service according to claim 1, wherein the processor is configured to use a root mean square error (RMSE) that is a value weighted by displaying a scale value of the AR object on a screen of an AR terminal as an objective measure of a spatial quality of the adaptive AR streaming service.

11. The system for providing an adaptive augmented reality (AR) streaming service according to claim 10, wherein the processor is configured to define initial latency as a time interval required to display all AR objects of an AR content on the screen, and adopt the initial latency as a measure of a temporal quality of the adaptive AR streaming service.

* * * * *